United States Patent [19]

Gerace et al.

[11] Patent Number: 5,160,628
[45] Date of Patent: Nov. 3, 1992

[54] METHOD OF MAKING A FILLER FROM AUTOMOTIVE PAINT SLUDGE, FILLER, AND SEALANT CONTAINING A FILLER

[75] Inventors: Michael J. Gerace; Janet M. Gerace, both of Dayton, Ohio

[73] Assignee: Aster, Inc., Yellow Springs, Ohio

[21] Appl. No.: 763,324

[22] Filed: Sep. 20, 1991

[51] Int. Cl.⁵ .............................................. B01D 37/00
[52] U.S. Cl. ........................................ 210/667; 34/60; 34/12; 210/751; 210/770; 210/806
[58] Field of Search ............... 210/751, 770, 806, 206, 210/688, 667; 34/12, 60

[56] References Cited

U.S. PATENT DOCUMENTS

| | | | |
|---|---|---|---|
| 2,152,716 | 4/1939 | Van Wirt et al. | 134/58 |
| 3,764,013 | 10/1973 | Eisenmann | 210/205 |
| 3,800,865 | 4/1974 | Onarheim et al. | 165/92 |
| 3,926,129 | 12/1975 | Wall | 110/716 |
| 4,100,066 | 7/1978 | Bloomer et al. | 210/44 |
| 4,193,206 | 3/1980 | Maffet | 34/12 |
| 4,441,437 | 4/1984 | Moskau | 110/346 |
| 4,708,775 | 11/1987 | McGregor et al. | 203/40 |
| 4,750,274 | 6/1988 | Erdman, Jr. et al. | 34/39 |
| 4,980,030 | 12/1990 | Johnson et al. | 203/4 |
| 5,087,375 | 2/1992 | Weinwurm | 210/751 X |

FOREIGN PATENT DOCUMENTS 376020  7/1990  European Pat. Off. .

*Primary Examiner*—Frank Spear
*Attorney, Agent, or Firm*—Killworth, Gottman, Hagan & Schaeff

[57] ABSTRACT

A method for making a filler from automotive paint sludge is provided. Paint sludge containing water, solvent and uncured polymer resin is treated by removing a first portion of the water by mechanically drying the sludge to produce a concentrated sludge, and a second portion of the water is removed by treating the sludge with a chemical drying agent to produce a dried powder. Alternatively, the second portion of the water may be removed by agitating the concentrated sludge under a vacuum to produce a dehydrated putty. The resulting dried powder or putty can then be used as a filler in sealants and other products.

12 Claims, No Drawings

METHOD OF MAKING A FILLER FROM AUTOMOTIVE PAINT SLUDGE, FILLER, AND SEALANT CONTAINING A FILLER

This invention relates to a method for making a filler from automotive paint sludge, the filler produced by that method, and a sealant containing such a filler. More particularly, it involves a method for converting wet paint sludge into a dried putty or free-flowing powder either of which can be used as a filler and a sealant prepared using that filler.

BACKGROUND OF THE INVENTION

The treatment of chemical waste is a topic of vital concern to industry and to all those concerned with the environment. Increasingly, governmental regulations are aimed at controlling the type and quantity of waste materials generated by industry because of the potential effect on the environment. As a result, treatment methods which reduce or eliminate chemical waste are of great interest to industry.

The automotive paint and coatings industry is a major source of chemical wastes. It is estimated that nearly 40% of the 6 gallons of paint used to produce the exterior finish on an automobile ends up as waste. With an estimated 36 million cars built each year (not including light trucks and other vehicles), the waste generated from painting alone approaches one quarter of a billion pounds. If this waste paint could be turned into a useful product, a major source of chemical waste could be reduced or eliminated.

When an automobile is painted on an assembly line, the excess paint is collected beneath the automobile in a trough filled with water. Typically, the waste paint solids are recovered by placing the paint-water mixture into large settling tanks. The paint solids either agglomerate as a raft on the surface of the water, or they sink and accumulate on the bottom of the tank. Other methods for treating the paint-water mixture to remove the paint solids are disclosed in U.S. Pat. Nos. 3,764,013 and 4,100,066. The material recovered from such processes is known as paint sludge.

Paint sludge is very complex material. The paint component contains uncured polymer resins, pigments, curing-agents, surfactants, and other minor formulation ingredients. In addition, paint sludge contains water and a variety of other solvents. The presence of the uncured paint resins, which cure and form a film upon heating, make the sludge very sticky and difficult to handle. Therefore, detackification agents are often added to the sludge.

The raw detackified paint sludge is usually disposed of without further processing. It is a tackfree, pulpy, putty-like solid having about 25% residual water. The cost and the environmental impact of disposing of paint sludge in this form make it undesirable.

Recently, a process was developed in which the detackified sludge is converted to a dry powder prior to disposal. The first step of this process, which is disclosed in U.S. Pat. No. 4,980,030, involves removing a portion of the water and liquid hydrocarbons from the sludge. The high solids sludge is then heated to remove the remaining water and hydrocarbons. The heating step is also designed to cure the uncured polymeric paint resins. The process is advantageous because it reduces the volume of waste produced, and the resulting powder is somewhat easier to handle than the wet sludge.

However, because the process disclosed in U.S. Pat. No. 4,980,030 involves curing the polymeric paint resins in the sludge, the dry particulate material formed is extremely hard, very abrasive, and difficult to reduce in size. The extreme hardness and large particle size of this powder preclude its use as, for example, a filler in sealants and adhesives without further processing.

Additional advantage could be achieved if a practical use could be found for the powder produced. One potential use for the powder is a filler in adhesives and sealants. Almost all sealants and adhesives contain an inert filler as a part of their composition, usually ranging from 10 to 50% by weight. Fillers are generally materials of fine particle size that are dispersable in organic media without the effects of settling. They are used to modify the properties of more costly ingredients. If paint sludge could be converted to a small pliable, tack-free particles, they could be used in adhesives and sealants as a filler. Although a dry powder is easy to handle and store, it is not necessary that the sludge be converted to a dry powder form. Any soft, pliable substance, such as a putty, could also be incorporated into the sealant.

Therefore, there remains a need for a process which will convert wet paint sludge into a form that is unsealable as a filler and can be easily incorporated into a sealant. One form could be a dry powder which is softer, less abrasive, and easier to reduce in particle size than powders containing fully cured polymeric resins. Another form could be a putty that also can be easily incorporated into the sealant.

SUMMARY OF THE INVENTION

The present invention solves that need by providing a method for converting paint sludge containing water, solvent, and uncured polymer resin into a dehydrated putty-like material or into a dried free-flowing powder. Either the dehydrated putty or the dried powder may be used as a filler. The method includes a bulk drying step and then one of two additional processes, depending on whether a putty or dry powder is desired.

In the bulk drying step, a first portion of the water is removed by mechanically drying the paint sludge to produce a concentrated sludge. The purpose of this step is to remove gross water and solvent without altering the composition of the paint sludge. Any physical method of removing the water and solvent, such as vacuum filtration can be used.

At this point, the concentrated sludge can be treated with a chemical drying agent such as calcium oxide, to remove the free water from the sludge. The water is reacted with a chemical drying agent which is capable of either consuming the water or converting it to another molecular form. In the case of calcium oxide as the drying agent, a dried free-flowing powder is formed. The dried powder may be milled to a desirable particle configuration if it is to be used as a filler. The preferred particle size for use as a filler is 0.1 to 50 microns, with 1 to 10 microns being the most preferred.

If a putty is desired (or if only a minimal amount of chemical drying agent is acceptable in the filler), the concentrated sludge obtained from the bulk drying step can be agitated under a vacuum to produce a dehydrated mass or putty. Most of the remaining water will be removed by this step. This step may include heating the concentrated sludge to a temperature not exceeding about 100° F. so that the polymer resin in the paint sludge remains uncured Before using the resulting putty as a filler, a small amount of chemical drying agent, such as calcium oxide, can be mixed with the putty to react with any remaining water in the putty.

Because the filler of the present invention contains uncured polymer, it too will cure upon exposure to heat. Therefore, the filler of the present invention, not only acts as a filler in a sealant formulation but also as a binder. This property is particularly advantageous in an automobile sealant composition with regard to cost reduction and to improve the ability of the wet sealant to withstand the washes and primer applications experiences during the fabrication of car bodies. The dried powder produced by the present process is softer, easier to reduce in size, and less abrasive than powder containing fully cured polymer resin. It is therefore much easier to incorporate as a filler in sealants and other products. For example, the filler of the present invention may also be used in adhesives, molded or extruded plastic products, and structural composites. The putty form is also soft and pliable and is easily incorporated into sealant and other products of the type just mentioned. Still, use in a sealant and particularly an automobile sealant is most preferred because of the advantages offered to the automobile industry in not only disposing of the automotive paint sludge safely but also turning it into a material useful in a product used by the automobile industry.

Thus, the preferred sealant made with the filler of the present invention is a vinyl plastisol-based one useful as an automobile sealant. A vinyl plastisol is a finely divided polyvinyl chloride resin suspended in a plasticizer. The plastisols are liquids which are applied at low temperatures to the substrate. The liquid is converted to a solid through exposure to heat. In effect, the heat causes the suspended resin particles to be fused or dissolved in the plasticizer. A solid product results upon subsequent cooling.

Vinyl plastisols are excellent as sealants over all areas of the automobile body assembly line. They flow readily at room temperature to fill seams and body joints which need to be sealed. They adhere well to oily steel and primed metal surfaces. They can be painted over without leaching or causing other cosmetic problems. Finally, they are durable enough to withstand normal weather and user exposure. Another important quality of the vinyl plastisols is that they are not expensive.

Aside from the above-mentioned PVC resin, plasticizer and filler, it is also desirable to add a thermoplastic polymer resin material such as vinyl acetate ethylene to the sealant formulation in order to impart flexibility to the sealant. Other additives such as thixotropes, heat stablizers, pigments, other fillers, rubbers, wetting agents, and various combinations and mixtures thereof may be added.

Finally, there is present an adhesion promotion system. The adhesion promotion system preferably contains an unsaturated organosilane, and acrylic monomer, an unsaturated acid or anhydride monomer, an epoxy or modified epoxy resin and a hardening agent for the epoxy resin, such as a polyamide. Such a system is disclosed in U.S. Pat. No. 5,039,768, assigned to the same assignee as the present invention.

While use of the filler of the present invention in a vinyl plastisol automobile sealant is most preferred, as mentioned, it may be used in other types of sealants and adhesives such as hot melts, solvent or water based materials, preformed sealant tapes, adhesive films, contact adhesives, etc. It may also be used in molded or extruded plastic products and composites as also mentioned.

Therefore, it is an object of the present invention to provide a method for converting wet paint sludge to a dehydrated putty or dried powder which can be used as a filler, to provide a novel filler, and to provide a sealant made with that filler. These and other objects and advantages of the present invention will become apparent to those skilled in the art from a reading of the following detailed description of the preferred embodiments and the appended claims.

DESCRIPTION OF THE PREFERRED EMBODIMENTS

The raw paint sludge from the painting operation contains about 50% residual water. In the bulk drying step, a first portion of the water is removed by mechanically drying the paint sludge to provide a concentrated sludge of about 33% residual water. The purpose of this step is to remove gross water and solvent from the paint sludge without altering its composition. Any physical method of removing the water and solvent can be used. Filtration, centrifugation, decantation, pressing, distillation, extraction, freeze drying, and fluidized bed drying are examples of methods for mechanically drying the paint sludge. Filtration is preferred.

At this point, the concentrated sludge can be treated with a chemical drying agent to remove the free water from the sludge. The water is reacted with a chemical drying agent which is capable of either consuming the water or converting it to another molecular form. Hydration and hydrolysis are examples of processes which accomplish this result. Anhydrous forms of chemicals suitable for dessication such as calcium oxide, calcium sulfate, calcium chloride, magnesium sulfate, sodium sulfate, potassium carbonate, oxazolidines, and orthoesters (for example ethyl ortho formate) may be used in this step. Molecular sieves can also be used. Calcium oxide is preferred, and results in the formulation of a dried powder.

When all of the water has been removed, the dried powder may undergo a milling step. When the dried powder is to be used as a filler, it may be necessary to mill the dried powder to a desired particle configuration. The preferred particle size for use a filler is 0.1 to 50 microns, with 1 to 10 microns being the most preferred. Any suitable milling equipment can be used including ball mills, rotary knife granulators, dicers, choppers, pulverizers and grinders.

The dried powder produced by the present invention can act as a rheology modifier when used as a filler in sealants. It can also be used in adhesive compositions. Because of its somewhat polymeric-like nature, it can provide a degree of dilatancy which cannot be achieved with traditional fillers. This allows the adhesive or sealant to be more wash-out resistant during exposure to various cleaning solutions used in the automotive assembly operation.

If a putty is desired (or if only a minimal amount of chemical drying agent is acceptable in the sealant), the concentrated sludge from the bulk drying step can be agitated under a vacuum to produce a dehydrated mass or putty. The agitation of the paint sludge maximizes the removal of the water by the vacuum. Most of the remaining water will be removed by this step. Among the equipment which can be used for this drying step are the following: double planetary mixers, double-arm or sigma blade mixers, kneader-extruders, ribbon blenders, conical screw mixers, and horizontal plow-paddle mixers. A double planetary mixer is preferred.

This process may also include mild heating. In this case, it is important that the temperature not exceed 100° F. for more than 60 min. so that the uncured polymer resin in the paint sludge remains uncured. Before adding the resulting putty to the sealant, a small amount of chemical drying agent (such as those listed above) can be mixed with the putty to react with any residual water in the putty.

With regard to the preferred sealant made with the filler of the present invention, as mentioned, preferably it contains a polyvinyl chloride resin, plasticizers, thermoplastic resin, adhesion promoter, and additives in addition to the filler produced by the method disclosed above.

Polyvinyl chloride resins used in the compositions of this invention are finely divided resin particles which are capable of being dispersed in a plasticizer. The resins are well known and have been widely used in plastisol compositions. The polyvinyl chloride resins include polymers of vinyl chloride as well as copolymers of vinyl chloride with copolymerizable vinyl addition monomers. Examples of such vinyl addition monomers include vinyl acetate, the vinyl acetals, maleic esters, styrene, vinylidene chloride and acrylonitrile. The particularly preferred polyvinyl chloride resins are the fine particle disperson type vinyl chloride/vinyl acetate copolymer resins and vinyl chloride/maleic ester copolymers in a monomer weight ratio of vinyl chloride to vinyl ester of from about 99:1 to about 90:10. Blends of several different polyvinyl chloride resins may also be used and will also be referred to as the polyvinyl chloride resin, even though more than one resin may actually be present. A blend of 50-100% and most preferably 50-75% of a copolymer dispersion resin and 0-50% and most preferably 25-50% of a vinyl chloride/maleic ester copolymer blending resin is preferred.

Plasticizers useful in the present invention include monomeric types selected to achieve desired characteristics such as proper gelation, fusion, and flow properties. Examples of such monomeric plasticizers include monomeric esters of phthalic, benzoic, succinic, adipic, sebacic, talic, lauric, azelaic, trimellitic and stearic acids. Specific plasticizers include dioctyl phthalate, ethylene glycol dibenzoate, dioctyl succinate, dibutyl sebacate; dibenzyl azelate; didecyl glutarate and similar compounds. Other monomeric plasticizers include esters of 2,2,4-trimethyl-1,3-pentanediol, citric acid esters and n-ethyl toluenesulfonamide. Preferred is diisodecyl phthalate.

Polymeric plasticizing agents can be used in conjunction with the monomeric plasticizers in order to achieve special characteristics such as permanence, weathering resistance, and especially paintability. Polymer plasticizers useful in the present invention include the higher molecular weight polymeric acid esters (molecular weights greater than 1000). Examples of these polymeric plasticizers include esters of succinic, adipic, sebacic, talic, lauric, azelaic, caprylic, hexanoic, benzoic, phthalic, phosphoric, oleic, glutaric, trimellitic and stearic acids, including mixtures or blends of these compounds. The polymeric plasticizers have low diffusion rates because of their higher molecular weights and also act to retard the migration of other components from the applied compositions. Additionally, low molecular weight chlorinated paraffinic oils and epoxidized soybean oil can be used as a co-plasticizers. Again, blends of several different plasticizers may be used, but will be referred to simply as the plasticizer.

The elastomer component is preferably a thermoplastic polymeric resin such as vinyl acetate ethylene. Some examples of thermoplastic polymeric resins that could be used include ethylene vinyl acetate, vinyl acetate ethylene, vinyl acetate, acrylonitrile, acrylonitrile butadiene copolymer, chlorinated ethylene vinyl acetate, polyepsilon caprolactone, methyl methacrylate and polybutylene terephythalate. An ethylene vinyl acetate having a 20-80% vinyl acetate content is preferred. Vinyl acetate ethylene copolymers having a vinyl acetate content of preferably 50-70% and most preferably 60-65% are highly preferred because of their balance of compatibility, flow, adhesion and flexibility.

The adhesion promotion system used in the sealant formulation preferably contains an unsaturated organosilane; an acrylic monomer; and an unsaturated acid or anhydride monomer. Most preferably it also contains an epoxy resin or modified epoxy resin and a hardening agent for the epoxy resin, such as a polyamide or modified polyamide. All of the unsaturated materials are capable of polymerization with peroxide initiation and heat. The formation of a highly functionalized oligomeric or polymeric modified acrylic species in situ (after heating) in concert with the reacted epoxy resin presumably is what is responsible for the tenacious bonding of the current adhesive to oily metals.

Examples of unsaturated organosilanes are the vinyl, acrylic and methacrylic types such as vinyl trichlorosilane, vinyl triethoxy silane, vinyl trimethoxy silane, vinyl-tris B-methoxy-ethoxy silane, 3-methacryloxypropyl trimethoxy silane. Examples of acrylic monomers are any of the free radical induces polymerizable mono or multifunctional acrylic or methacrylic monomers such as trimethylolpropane trimethacrylate, hexane diol diacrylate, and butyl methacrylate. Examples of unsaturated acid or anhydride monomers are the vinyl, acrylic, and methacrylic mono or poly functional acid or anhydride materials such as maleic, acrylic, crotonic, methacrylic, oleic, linoleic, and tetrahydrophthalic acid or anhydride.

Examples of unmodified epoxy resins are those based on bisphenol-A and epichlorohydrin with typical properties that includes an epoxy value of 152-155 equiv./100 g and a weight per epoxide of 182-192. Other typical epoxy resins are phenol novolac, triphenylolmethane, and tetrabromo bis-A. An example of a modified epoxy resin includes the preferred elastomeric modified liquid epoxy resin which is a 40% adduct of carboxylated acrylonitrile butadiene elastomer and a liquid bisphenol-A and epichlorohydrin type epoxy. That adduct has a weight per epoxide of 325-375. Curing for the epoxy or modified epoxy resin is accomplished by reacting the resin with an appropriate curing or hardening agent. Typical hardening agents are polyamides, diethylenetriamine, methane diamine, m-phenylene diamine, diaminodiphenyl sulfone, tris (dimethyl amino methyl) phenol, dicyandiamide, BF3-monoethly amine and nadicmethyl anhydride. Preferred is a modified polyamide hardening agent such as a latent polyamide dispersion which is an adduct of phthalic anhydride and diethylenetriamine in an unmodified liquid epoxy resin. The epoxy of modified epoxy resin/hardening agent system apparently modifies the galvanized surface by reacting with and/or to the adhesion promotion system in the preferred embodiment.

It has been found that inclusion of the adhesion promotion system in the compositions at the stated level significantly increases the adhesion of the composition to a metal surface without adversely affecting the qualities of the applied composition. That is, the composition's resistance to primer wash, paintability, viscosity stability, etc. are not adversely affected by the adhesion promoter. Other adhesion promoters are also preferably used with the current materials and, again, reference to the adhesion promoter is reference to the adhesion promoter system unless otherwise indicated.

Optional components of the composition of the invention comprise additives such as rubbers, waxes, heat stabilizers, other fillers, pigments, and wetting agents. Such components are readily available. Amorphous waxes, carnauba wax, castor oil wax and various synthetic waxes can be useful. Examples of heat stabilizers include lead and barium-cadmium-zinc systems. Other fillers include ground and precipitated calcium carbonate, ground silica, clays and talcs. Examples of wetting agents are polyethylene glycol derivatives.

EXAMPLE

(A) Preparation of Filler from Wet Paint Sludge

Bulk Drying Process—Raw wet detackified paint sludge was vacuum-filtered and pressed to remove the bulk of the water from the sludge. This was accomplished using a Buchner funnel fixed to a vacuum flask which was connected to a water aspirator. The mass was also pressed with a spatula, while in the funnel, to aid in water removal. The resulting material, a concentrated sludge, contained about 31% volatiles.

Dry Powder Process—To form a dried powder, the concentrated sludge from the bulk drying process was vigorously mixed with an equal amount of calcium oxide for 5 minutes on a Sunbeam mixer. This was enough calcium oxide to react with all of the water in the sludge (in this example, a slight excess was used). Small amounts (50 grams) of this mixture were made as needed. The resulting dried powder was readily incorporated into the sealant without milling due to the soft nature of the particles formed.

Putty Process—To form a putty, one thousand grams of concentrated sludge from the bulk drying process was added to a 2-gallon Ross double planetary mixer fitted with an ice trap. The jacketed mixing bowl was heated with warm water to counteract the cooling caused by water evaporation from the paint sludge. The sludge was agitated for 5 hours under a vacuum of about 711 mm Hg (49 mm Hg absolute) to produce a dehydrated mass or putty of about 2% volatiles.

Before incorporating the putty in the sealant, it was mixed with a small amount of calcium oxide to remove the residual water. The amount of calcium oxide used was always in excess of 50:3 ratio of putty to calcium oxide.

(B) Preparation of Sealant from Filler

Seven automotive body shop sealers were prepared as follows: Three of the sealers contained increasing amounts of powdered filler. Another three sealers were prepared with increasing amounts of putty filler. One control sealer was prepared without a filler of the present invention type, and contained 13% of thermoplastic polymer. In each formula containing a filler of the present invention, an amount of thermoplastic polymer resin was removed equal to the total amount of filler that was added, up to a maximum of 11 percent thermoplastic polymer resin removal. It was desirable to maintain 2 percent thermoplastic polymer resin to impart the desired properties to the formula. In formulations that would have required additional removal of the thermoplastic polymer resin, a mixture of calcium carbonate filler and plasticizer in a ratio of 2:1 was removed instead. Because the filler of the present invention contained an excess of calcium oxide drying agent, no further calcium oxide was added to the sealant, as was added in the control.

|  | Formulations (%) | | | | | | |
|---|---|---|---|---|---|---|---|
|  | 1 | 2 | 3 | 4 | 5 | 6 | 7 |
| Ingredient | | | | | | | |
| Copolymer dispersion resin(1) | 19 | 19 | 19 | 19 | 19 | 19 | 19 |
| Copolymer Blending resin(2) | 8 | 8 | 8 | 8 | 8 | 8 | 8 |
| Diisodecyl phthalate plasticizer | 28.96 | 26.96 | 24.96 | 28.96 | 28.96 | 28.96 | 28.96T |
| hermoplastic resin(3) | 2 | 2 | 2 | 7 | 4 | 2 | 13 |
| Triacrylate adhesion promoter(4) | 4.5 | 4.5 | 4.5 | 4.5 | 4.5 | 4.5 | 4.5 |
| Silane adhesion promoter(5) | 0.5 | 0.5 | 0.5 | 0.5 | 0.5 | 0.5 | 0.5 |
| Cumene hydroperoxide | 0.08 | 0.08 | 0.08 | 0.08 | 0.08 | 0.08 | 0.08 |
| Tetrahydrophthalic anhydride | 0.3 | 0.3 | 0.3 | 0.3 | 0.3 | 0.3 | 0.3 |
| Elastomeric modif. liquid epoxy resin promoter(6) | 2 | 2 | 2 | 2 | 2 | 2 | 2 |
| Modif. polyamide hardening agent(7) | 3 | 3 | 3 | 3 | 3 | 3 | 3 |
| Calcium organic thixotropic agent(8) | 0.5 | 0.5 | 0.5 | 0.5 | 0.5 | 0.5 | 0.5 |
| Anionic surfactant wetting agent(9) | 0.16 | 0.16 | 0.16 | 0.16 | 0.16 | 0.16 | 0.16 |
| Calcium carbonate filler(10) | 19 | 15 | 11 | 19 | 19 | 18 | 19 |
| Calcium oxide drying | — | — | — | — | — | — | 1 |
| Powder filler from Part A: | | | | | | | |
| Bulk sludge: | 6 | 9 | 12 | — | — | — | — |
| Calcium oxide drying agent: | 6 | 9 | 12 | — | — | — | — |
| Putty filler from Pat A: | | | | | | | |
| Dried putty sludge: | — | — | — | 6 | 9 | 12 | — |

-continued

|  | Formulations (%) | | | | | | |
| --- | --- | --- | --- | --- | --- | --- | --- |
|  | 1 | 2 | 3 | 4 | 5 | 6 | 7 |
| Calcium oxide drying agent: | — | — | — | 1 | 1 | 1 | — |
|  | 100% | 100% | 100% | 100% | 100% | 100% | 100% |

(1)A copolymer available from Huls Corp. as Vestolit E7091.
(2)A copolymer of vinyl chloride and dibutyl maleate available from the Goodyear Tire and Rubber Co. as Pliovic MC-85.
(3)A hot-applied resin available from Quantum Chemical as Vynathene EY80031.
(4)Available from CPS Chemical Co. Inc. as Ageflex TMPTA.
(5)Available from Dow Corning as Z-6030 Silane.
(6)Available from Seegott, Inc. as Epi-Rez 58005.
(7)Available from Ciba-Geigy Corp. as Hardener HY940.
(8)Available from Ashland Chemical Co. as Ircogel 903.
(9)Available from BYK Chemie USA as Byk-W960.
(10)Available from H. M. Royal as Hakuenka CC.

C. Comparison of the Physical Properties of the Sealants.

| | 1 | 2 | 3 | 4 | 5 | 6 | 7 |
| --- | --- | --- | --- | --- | --- | --- | --- |
| Adhesion Panel(1) | | | | | | | |
| HD(2): | 9.5 | 9 | 8.5 | 7.5 | 6 | 5 | 3.5 |
| Galv.(3): | 9.5 | 9.5 | 9.5 | 9.5 | 9 | 8.5 | 10 |
| CRS(4): | 9.5 | 9 | 9.5 | 9 | 9 | 8.5 | 9.5 |
| | 9.5 | 9 | 9.5 | 9 | 9 | 8.5 | 9.5 |
| Shear Overlaps(5) | | | | | | | |
| GRS/HD psi: | 274 | 408 | 422 | 228 | 232 | 213 | 285 |
| Galv/Galv.psi: | 300 | 436 | 444 | 263 | 257 | 214 | 288 |
| CRS/HD % CF: | 95 | 95 | 68 | 93 | 40 | 27 | 99 |
| Galv/Galv % CF: | 100 | 100 | 98 | 99 | 72 | 55 | 100 |
| Viscosity (poise)(6) | 310 | 360 | 460 | 1860 | 580 | 260 | 10,480 |
| Hardness (Shore A Durometer) | 72 | 75 | 79 | 70 | 70 | 70 | 57 |
| % Elongation | 85 | 96 | 75 | 128 | 94 | 84 | 170 |

(1)Test method involving the application and curing of the sealant on various metal substrates followed by manually removing the sealant from the metal to determine the character of the adhesive bond. The panel is graded from 0 to 10, with 0 equivalent to no adhesion and 10 being the best adhesion possible. The best adhesion possible is here when the sealant must be torn to remove it from the panel and a layer of sealant remains on the panel. This is called cohesive failure (CF).
(2)Available from Advanced Coating Technologies, Inc. (ACT) as APR 10260 hot dip galvanized panels.
(3)Available from ACT as APR 10220 galvaneal panels.
(4)Available from ACT as APR 10161 cold rolled steel panels.
(5)Test method involving bonding two 1 × 4 inch strips together with sealant. A one-inch square overlap section is bonded together with the sealant and then pulled apart on a tensile testing machine at a rate of 2 inches per minute. The force to pull the sample apart is recorded in pounds per square inch. The percent cohesive failure is also recorded.
(6)Measured on a Caster Severs Rheometer.

It will be obvious to those skilled in the art that various changes any be made without departing from the scope of the invention which is not to be considered limited to what is described in the specification.

What is claimed is:

1. A method for treating paint sludge containing water, solvent, and uncured polymer resin comprising:
   removing a first portion of said water by mechanically drying said paint sludge to remove gross water and solvent without altering the composition of the paint sludge and to produce a concentrated sludge, and
   removing a second portion of said water by treating the concentrated sludge with a chemical drying agent to produce a dried powder containing uncured polymer.

2. The method of claim 1 further comprising milling the dried powder to particle size of 0.1 to 50 microns.

3. The method of claim 2 wherein said particle size is 1 to 10 microns.

4. The method of claim 1 wherein the step of removing a first portion of said of water is by mechanical drying said point sludge by a method elected from the group consisting of filtration, centrifugation extraction, freeze drying, and fluidized bed drying.

5. The method of claim 1 wherein said chemical drying agent is selected from the group consisting of calcium oxide, calcium sulfate, calcium chloride, magnesium sulfate, sodium sulfate, potassium carbonate, oxazolidines, and orthoesters.

6. A dried powder produced by the process of claim 1.

7. A sealant comprising a polyvinyl chloride resin, plasticizer, rubber, curative, adhesion promoter, additives, and a filler material in the form of the dried powder of claim 6.

8. A method for treating paint sludge containing water, solvent, and uncured polymer resin comprising:
   removing a first portion of said water by mechanically drying said paint sludge to remove gross water and solvent without altering the composition of the paint sludge and to produce a concentrated sludge, and
   removing a second portion of said water by agitating said concentrated sludge under a vacuum at a temperature not exceeding 100° F. so that said uncured polymer resin remains uncured to produce a dehydrated putty containing uncured polymer.

9. The method of claim 8 wherein the step of removing a first portion of said water is by mechanical drying said paint sludge by a method selected from the group consisting of filtration, centrifugation extraction, freeze drying, and fluidized bed drying.

10. The method of claim 9 further including the step of removing residual water from said dehydrated putty by treating said putty with a chemical drying agent; said chemical drying agent being selected from the group consisting of calcium oxide, calcium sulfate, calcium chloride, magnesium sulfate, sodium sulfate, potassium carbonate, oxazolidines, and orthoesters.

11. A dehydrated putty produced by the process of claim 8.

12. A sealant comprising a polyvinyl chloride resin, plasticizer, rubber, curative, adhesion promoter, additives, and a filler material in the form of the dehydrated putty of claim 11.

* * * * *